US007350932B2

(12) United States Patent
Lin et al.

(10) Patent No.: US 7,350,932 B2

(45) Date of Patent: Apr. 1, 2008

(54) PRESSED KEY STRUCTURE WITH LIGHTING MODULE

(75) Inventors: Tsung Kai Lin, Taipei (TW); Lii Hwang Chen, Taipei (TW)

(73) Assignee: Tatung Co., Ltd, Taipei (TW)

( * ) Notice: Subject to any disclaimer, the term of this patent is extended or adjusted under 35 U.S.C. 154(b) by 315 days.

(21) Appl. No.: 11/142,350

(22) Filed: Jun. 2, 2005

(65) Prior Publication Data

US 2006/0139313 A1 Jun. 29, 2006

(30) Foreign Application Priority Data

Dec. 28, 2004 (TW) .............................. 93141019 A

(51) Int. Cl.
*G01D 11/28* (2006.01)

(52) U.S. Cl. ........................... 362/29; 362/30; 200/314

(58) Field of Classification Search .................. 362/24, 362/29, 30, 95; 200/314, 316, 317

See application file for complete search history.

(56) References Cited

U.S. PATENT DOCUMENTS

| | | | | |
|---|---|---|---|---|
| 4,343,975 | A * | 8/1982 | Sado | 200/314 |
| 4,908,485 | A * | 3/1990 | Honda et al. | 200/314 |
| 6,210,010 | B1 * | 4/2001 | Pontetti et al. | 362/24 |

* cited by examiner

*Primary Examiner*—Stephen F Husar
(74) *Attorney, Agent, or Firm*—Lowe Hauptman Ham & Berner

(57) ABSTRACT

The present invention concerns to a press key structure with a light module in use of illuminant variation for arrow keys of an appliance. The press key structure with light module comprises a key base plate, a light source, a spread slice and a light guiding cap. The light guiding cap includes a crown part, a chamber, and a mouth part that is set on the key base plate and can exactly cover up the above light source. The spread slice is set in the chamber of the light guiding cap so that the light is evenly spread through the light guiding function of the spread slice. Moreover, by adjusting the thickness, transparency, and inside cambered surface of the spread slice, or the distance between the spread slice and the light source, the light guiding property thereof can be modulated.

6 Claims, 3 Drawing Sheets

PRESSED KEY STRUCTURE WITH LIGHTING MODULE

RELATED APPLICATION

The present application is based on, and claims priority from, Taiwanese Application Ser. No. 093141019, filed Dec. 28, 2004, the disclosure of which is hereby incorporated by reference herein in its entirety.

BACKGROUND OF THE INVENTION

1. Field of the Invention

The present invention relates to a pressed key structure with a lighting module and more particularly, to a press key structure with a light module in use of illuminant variation for arrow keys of an appliance.

2. Description of Related Art

Light Emitting Diodes (LED) have become widespread in all popular appliances, such as Personal Digital Assistants (PDA), cell phones, digital cameras and video cameras. These products use white LED and color LED. In order to transmit light over a large area, several LED are placed on a base plate behind where the light is desired to be shown and the effect of light guidance is controlled by the degree of milk whiteness and thickness of the light guiding cap. However, this method raises the cost and causes waste of the components, as well as creating the drawbacks of concentrating the light spot and uneven light source.

Therefore, it is desirable to provide a press key structure with light module of the present invention that eliminates the aforesaid problems.

SUMMARY OF THE INVENTION

The present invention provides a press key structure with a light module in use of illuminant variation for arrow keys of an appliance, comprising a key base plate, a light source, a spread slice, and a light guiding cap. The aforesaid light source is fixed on the key base plate; the aforesaid light guiding cap contains a crown part, a chamber and a mouth part, and the mouth part is set on the key base plate and covers up the light source; and the aforesaid spread slice is set in the chamber of the light guiding cap. Therefore, the light guiding function of the spread slice can enhance the light emitting from the light source to spread evenly and improve the above-mentioned drawbacks.

Wherein, the spread slice can be fixed in the chamber according to an arithmetical ratio and is made of translucent flexible material, such as translucent silica gel. Moreover, by adjusting the thickness, transparency, and inside cambered surface of the spread slice, or the distance between the slice and the light source, the light guiding property thereof can be modulated.

DETAILED DESCRIPTION OF THE PREFERRED EMBODIMENT

Figure 1:
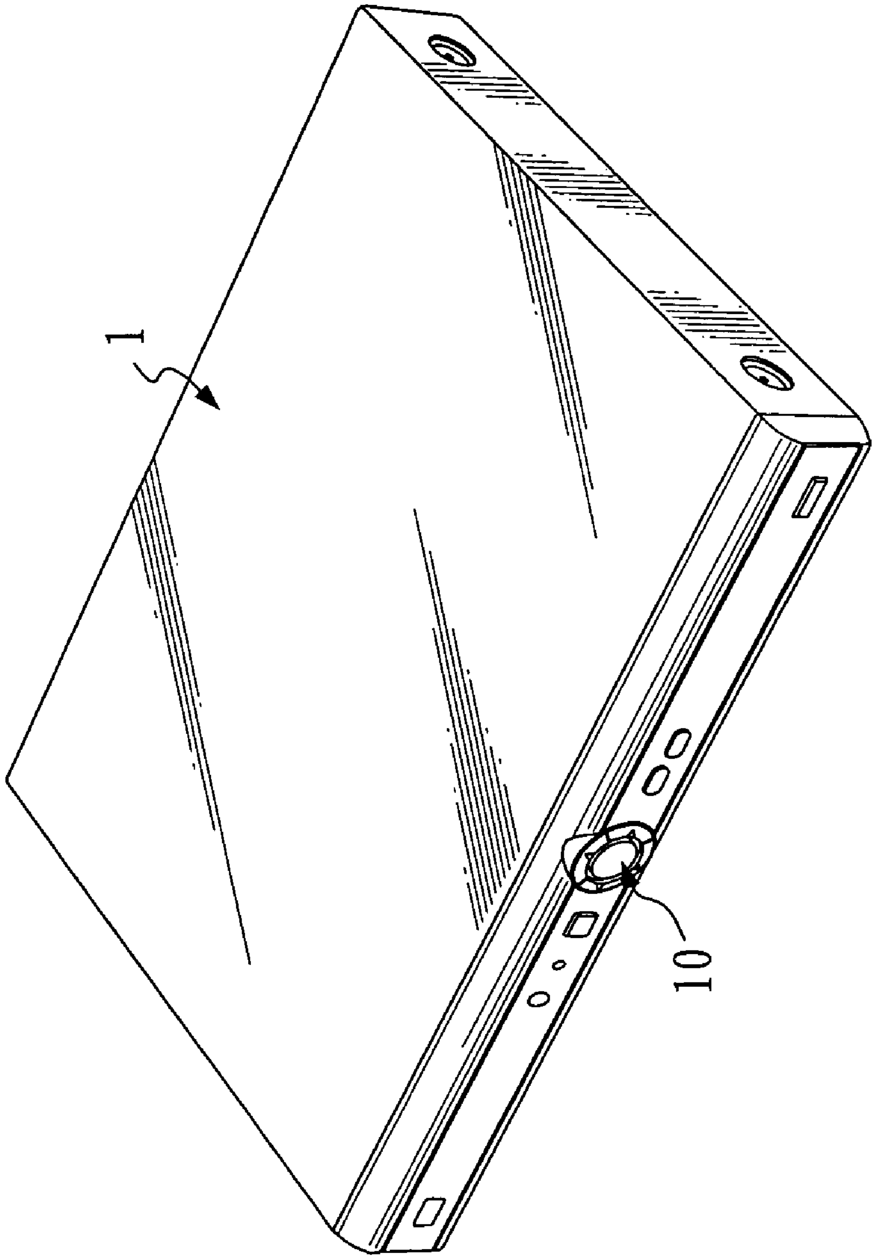
FIG. 1 is a perspective view of a media center extender of the present invention.

Referring to FIG. 1, a press key structure with a light module 10 is set on a media center extender 1 in use of illuminant variation for arrow keys.

Figure 2:
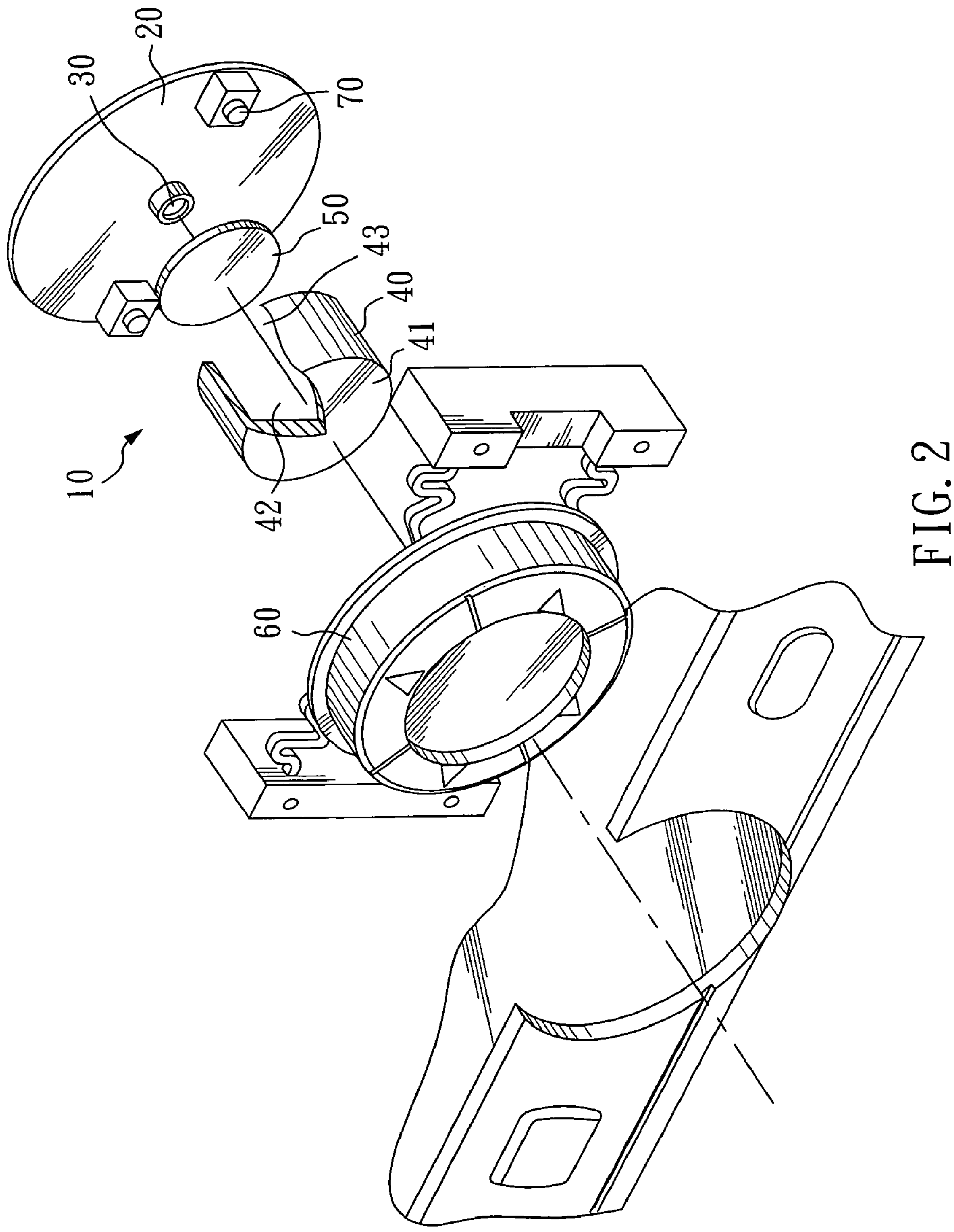
FIG. 2 is an exploded view of the press key structure with a light module of the present invention.
Figure 3:
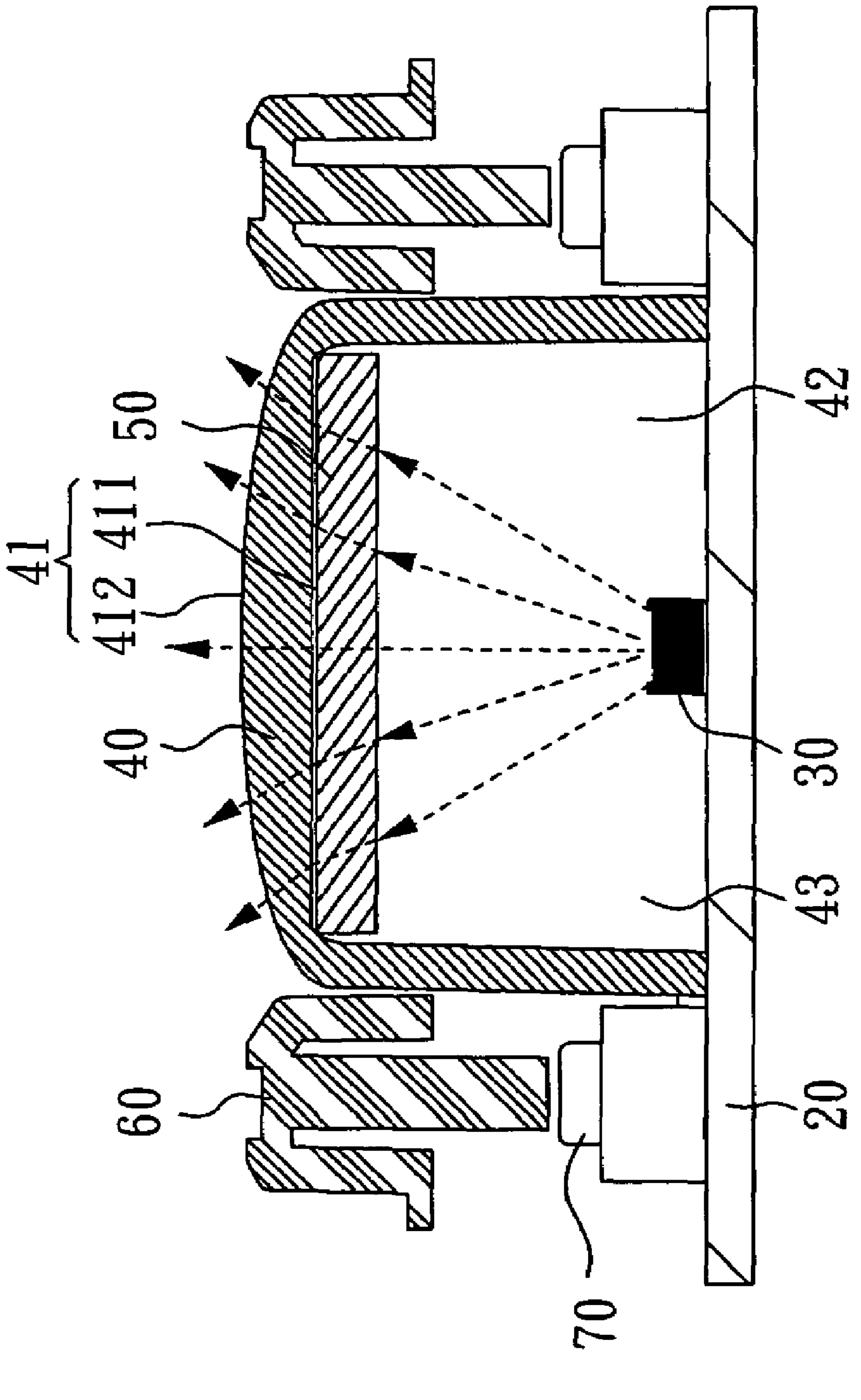
FIG. 3 is a sectional view of the press key structure with a light module of the present invention.

Referring to FIG. 2, the above press key structure with the light module 10 comprises a key base plate 20, a light source 30, a spread slice 50, and a light guiding cap 40. Referring to FIG. 3, the light source 30 is fixed on the key base plate 20. The light guiding cap 40 contains a crown part 41, a chamber 42, and a mouth part 43 which is set on the key base plate 20 and can exactly cover up the light source 30. Besides, the above spread slice 50 is made of translucent flexible material, such as translucent silica gel, and can be tightly set in the chamber 42; as a result, the light emitting from the light source 30 can be evenly spread and guided by the spread slice 50. In the manufacture process of the spread slice 50, white color powder can be added to adjust the degree of transparency. Furthermore, the thickness of the spread slice or its inside cambered surface can be varied to control the ability and effect of light transmittance. Moreover, by adjusting the distance between the spread slice 50 and the light source 30 the brightness can also be determined and thus improve the aforesaid drawbacks.

In this preferred embodiment, the press key structure with light module 10 is used for the purpose of illuminant variation for the arrow keys. Therefore, the key base plate 20 is a Printed Circuit Board (PCB) that comprises a set of arrow keys 60 and several touch panel keys 70 corresponding to arrow keys 60. The above light source 30 can be a tricolor LED lamp of red, green and blue colors. When the users press different directions of the arrow key 60 to trigger the corresponding touch panel keys 70, the above key base plate 20 will convey corresponding signals to control the tricolor LED lamp to emit lights of a single color or light of mixed colors.

Still referring to FIG. 3, the crown part 41 of the light guiding cap 40 contains a light-entering surface 411 and a light-exiting surface 412. The above spread slice 50 is set in the chamber 42 of the light guiding cap 40 and is adhered to the light-entering surface 411 of the crown part 41 of the light guiding cap 40; however, it can also be set apart from the light-entering surface 411 to adjust the distance to the light source 30. When the arrow key 60 is pressed to trigger a touch panel key 70, the key base plate 20 controls the light source 30 to emit light that is evenly transmitted by the spread slice 50.

Although the present invention has been explained in relation to its preferred embodiment, it is to be understood that many other possible modifications and variations can be made without departing from the spirit and scope of the invention as hereinafter claimed.

What is claimed is:

1. A press key structure with light module, comprising:

a key base plate;

a light source, mounted on said key base plate;

a light guiding cap containing a crown part, a chamber and a mouth part, and said mouth part of said light guiding cap is set on said key base plate and covers up said light source; and a spread slice, set in said chamber of said light guiding cap;

wherein said key base plate is a Printed Circuit Board (PCB); and wherein a set of arrow keys and multiple touch panel keys are set on said key base plate.

2. The press key structure with light module as claimed in claim 1, wherein said spread slice is made of translucent flexible material and can be fixed in said chamber.

3. The press key structure with light module as claimed in claim 2, wherein said spread slice is made of translucent silica gel.

4. The press key structure with light module as claimed in claim 1, wherein said crown part of said light guiding cap includes a light-entering surface and a light-exiting surface, and said spread slice is set in the chamber of said light guiding cap and is adhered to said light-entering surface of said light guiding cap.

5. The press key structure with light module as claimed in claim 1, wherein said light source is a tricolor LED (light emitting diode) lamp of red, green and blue colors.

6. The press key structure with light module as claimed in claim 1, which is in use of illuminant variation for the arrow keys.

* * * * *